United States Patent [19]

Charles

[11] 4,277,391

[45] Jul. 7, 1981

[54] DURABLE POLYESTER MOLDING COMPOSITION AND PRODUCT

[75] Inventor: John J. Charles, Bloomingdale, N.J.

[73] Assignee: GAF Corporation, New York, N.Y.

[21] Appl. No.: 107,796

[22] Filed: Dec. 27, 1979

[51] Int. Cl.³ .................... C08L 67/02; C08K 5/13; C08K 5/18; C08K 5/53

[52] U.S. Cl. ................ 260/40 R; 260/45.85 B; 260/45.9 QB; 260/45.95 D; 525/2; 525/6; 525/64; 525/65

[58] Field of Search ................ 525/2, 6, 64, 65; 260/40 R, 45.85 B, 45.95 D, 45.9 QB

[56] References Cited

U.S. PATENT DOCUMENTS

| | | | |
|---|---|---|---|
| 3,281,505 | 10/1966 | Spivack | 260/953 |
| 3,452,056 | 6/1969 | Sundholm | 260/390 |
| 3,644,482 | 2/1972 | Dexter et al. | 560/70 |
| 3,666,716 | 5/1972 | Wheeler | 260/45.7 S |
| 3,766,146 | 10/1973 | Witsiepe | 260/40 R |
| 4,010,219 | 3/1977 | Aoyama et al. | 260/45.8 A |
| 4,034,013 | 7/1977 | Lane | 260/42.18 |
| 4,096,202 | 6/1978 | Farnham et al. | 260/40 R |

*Primary Examiner*—Allan Lieberman
*Attorney, Agent, or Firm*—James Magee, Jr.; Joshua J. Ward

[57] ABSTRACT

Poly ($C_2$–$C_4$ alkylene terephthalate) molding composition containing three different types of antioxidants are disclosed.

14 Claims, No Drawings

DURABLE POLYESTER MOLDING COMPOSITION AND PRODUCT

BACKGROUND OF THE INVENTION

Poly ($C_2$–$C_4$ alkylene terephthalate) such as polyethylene terephthalate (PET) or polybutylene terephthalate (PBT) are well known resins for a number of uses including molding applications. Such resins are frequently blended with various additives to improve properties such as impact strength, resistant to warping, resistance to oxidation, flame resistance, thermal stability etc. U.S. Pat. Nos. 3,666,716, 3,644,382 and 3,281,505 describe certain antioxidants which have been suggested for use in polyester molding compositions. U.S. Pat. No. 4,010,219 describes certain epoxy compounds which have been suggested for use in imparting improved tensile properties to polybutylene terephthalate molding compounds. The use of Poly ($C_2$–$C_4$ alkylene terephthalate co-alkylene oxide) in polyester molding compositions is also known and is described for instance in U.S. Pat. No. 3,766,146. U.S. Pat. No. 4,096,202 and U.S. Pat. No. 4,034,013 describe certain impact modifiers which have been suggested for use with polyalkylene terephthalates.

SUMMARY OF THE INVENTION

It is an object of the present invention to provide improved polyester compositions suitable for the production of molded articles as well as molded articles of such compositions. As compared with known prior art compositions, molded articles of the invention have a combination of desirable properties including improved impact strength and retention of impact strength without sacrifice of other desirable properties.

Polyester molding composition of the invention comprises:

(a) at least about 40 wt% poly ($C_2$–$C_4$ alkylene terephthalate) based on total composition;

(b) between about 0.1 and about 5 wt% based on poly ($C_2$–$C_4$ alkylene terephthalate) of phosphonate of the formula:

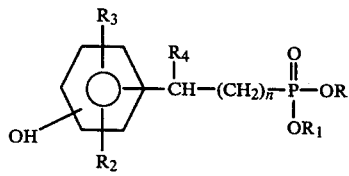

Formula I wherein n is 0 or 1 and:

(i) when n is 1, each of R and $R_1$ is alkyl, having from 12 to 24 carbon atoms and $R_2$ and $R_3$ each independently represents alkyl having from 1 to 18 carbon atoms; and (ii) when n is 0, $R_2$, OH and $R_3$ are fixed, respectively, in the 3, 4 and 5 positions of the benzene ring portion of the benzyl phosphonate, each of R and $R_1$ is higher alkyl of from 14 to 30 carbon atoms, $R_2$ is alkyl of 1 to 6 carbon atoms, $R_3$ is tertiary butyl and $R_4$ is hydrogen or methyl;

(c) between about 0.1 and about 5 wt% based on poly ($C_2$–$C_4$ alkylene terephthalate) of compound of the formula:

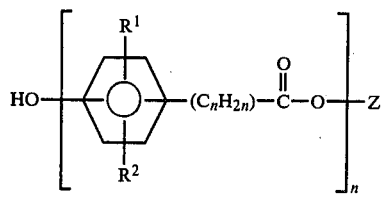

Formula II

Wherein:

$R^1$ is methyl, ethyl or an α-branched alkyl group of from 3 to 10 carbon atoms;

$R^2$ is hydrogen, methyl, ethyl or an α-branched alkyl group of from 3 to 10 carbon atoms;

X has a value of from 1 to 6;

n has a value of from 2 to 6; and

Z is an aliphatic hydrocarbon of the formula:

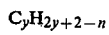

in which y has a value of from 2 to 18 when n is 2 and a value of from 3 to 6 when n is greater than 2, the value of y in all cases being equal to or greater than that of n; and (d) between about 0.1 and about 5 wt% based on poly ($C_2$–$C_4$ alkylene terepthalate of diphenylamine derivative of the general formula:

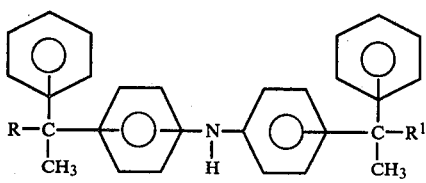

Formula III where R and $R^1$ are methyl or phenyl.

In a preferred embodiment the poly ($C_2$–$C_4$ alkylene terephthalate) comprises at least about 50 weight percent (wt%) polybutylene terephthalate (PBT) having an intrinsic visocosity (I.V.) between about 0.5 and about 1.5 deciliters per gram (dl/g) as determined in orthochorophenol at 25° C. PBT having an I.V. of between about 1.0 and about 1.5 dl/g is especially preferred. Further preferred embodiments involve the use of glass reinforcing fibers in amounts between about 5 and about 100 weight percent based on polyalkylene terephthalate as well as preferred multiphase polymer, poly ($C_2$–$C_4$ alkylene terephthalate-co-alkylene oxide) and diepoxy compound as described below.

DETAILED DESCRIPTION OF THE INVENTION

Polyalkylene terephthalates suitable for use in the invention include for instance polyethylene terephthalate, polypropylene terephthalate, and polybutylene terephthalate. Polybutylene terephthalate (PBT) is especially suitable and in a preferred embodiment of the invention comprises at least about 50 weight percent of the polyalkylene terephthalate used. The polyalkylene terephthalate used may be a single polyalkylene terephthalate or a blend of suitable polyalkylene terephthalates. As mentioned the composition of the invention includes at least about 40 weight percent poly ($C_2$–$C_4$ alkylene terephthalate). An especially preferred poly ($C_2$–$C_4$ alkylene terephthalate) comprises at least about 50 weight percent PBT having an intrinsic viscosity between about 1.0 and about 1.5 dl/g.

The compounds of formulas I, II and III mentioned above are three different types of antioxidants. It has been found, completely unexpectedly that the use of the combination of these three types of antioxidants results in vastly improved impact strength and retention of impact strength of molded articles made from the compositions of the invention.

Compounds of Formula I are described in greater detail in U.S. Pat. No. 3,281,505, the disclosure of which is incorporated herein by reference. Each of R and $R_1$ is alkyl, preferably having from 12 to 24 carbon atoms. Examples of useful alkyl groups represented by R and $R_1$ are methyl, ethyl, isopropyl, propyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, hexeicosyl, docosyl, tricosyl, tetracosyl, and the like. $R_2$ and $R_3$ each independently represents alkyl having from 1 to 18 carbon atoms, preferably having from 1 to 6 carbon atoms, especially tertiary butyl. Examples of useful alkyl groups are methyl, ethyl, propyl, isopropyl, butyl, secondary butyl, tertiary butyl, pentyl, hexyl, heptyl, octyl, nonyl, decyl, undecyl, dodecyl, tridecyl, tetradecyl, pentadecyl, hexadecyl, octadecyl, and the like.

When n is 0, $R_2$, OH and $R_3$ are fixed, respectively, in the 3, 4 and 5 positions of the benzene ring portion of the benzyl phosphonate. Each of R and $R_1$ is higher alkyl of from 14 to 30 carbon atoms, preferably 14 to 22. R and $R_1$ may be the same or different alkyl groups but in any event will contain at least 14 carbon atoms. Representative of such higher alkyl groups are tetradecyl, pentadecyl, hexadecyl, heptadecyl, octadecyl, nonadecyl, eicosyl, heneicosyl, docosyl, and the like up to triacontyl. $R_2$ is alkyl of 1 to 6 carbon atoms, and preferably a large bulky alkyl group such as a tertiary butyl group. $R_3$ is tertiary butyl and $R_4$ is hydrogen or methyl.

If n is 1, it is also preferred that at least one ($R_2$) and preferably both will always be ortho to the hydroxy group on the phenyl group in Formula I. One and preferably both of $R_2$ and $R_3$ should be a bulky group such as t-butyl or t-octyl. Particularly preferred compounds are those in which n is zero and $R_2$ OH and $R_3$ are fixed respectively in the 3, 4 and 5 positions of the benzene ring portion of the benzyl phosphonates.

Compounds of formula II are described in greater detail in U.S. Pat. No. 3,644,482, the disclosure of which is incorporated herein by reference. In such compounds $R^1$ is methyl, ethyl or a branched alkyl group of from 3 to 10 carbon atoms, $R^2$ is hydrogen, methyl, ethyl, or an α branched alkyl group of from 3 to 10 carbon atoms, x has a value of from 1 to 6, n has a value of from 2 to 6, and Z is an aliphatic hydrocarbon of the formula:

$$C_yH_{2y+2-n}$$

in which y has a value of from 2 to 18 when n is 2 and a value of from 3 to 6 when n is greater than 2, the value of y in all cases being equal to or greater than that of n. Thus the mono- or dialkylphenolic group includes for example:

3,5-di-t-butyl-4-hydroxyphenyl,
3,5-dimethyl-4-hydroxyphenyl,
3,5-di-isopropyl-4-hydroxyphenyl,
2,5-dimethyl-4-hydroxyphenyl,
2-methyl-4-hydroxy-5-t-butylphenyl,
2-methyl-4-hydroxy-5-isopropylphenyl,
3-methyl-4-hydroxy-5-t-butylphenyl,
3,5-diethyl-4-hydroxyphenyl and the like. Preferred phenolic groups are those having at least one branched group such as isopropyl, t-butyl or the like in a position ortho to the hydroxy group. Compounds in which the alkylphenolic group is 3,5-di-t-butyl-4-hydroxyphenyl are expecially preferred.

Compounds of formula III are described in greater detail in U.S. Pat. No. 3,452,056, the disclosure of which is incorporated herein by reference. R and $R^1$ are preferably methyl.

A diepoxy compound is also preferably present in compositions of the invention in amounts between about 0.1 and about 15 weight percent based on poly ($C_2$–$C_4$ alkylene terephthalate) and is represented by the general formula:

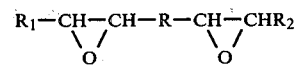

wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene, alkarylene or aralkylene, each of which may optionally have an ether group and/or an ester group, and R may be optionally bonded to $R_1$ and/or $R_2$.

Suitable diepoxy compounds which may be used in the practice of this invention include polycondensates of epihalohydrin such as epichlorohydrin with a diol, preferably having up to 15 carbon atoms, such as diphenylolpropane (so called bisphenol "A") in any ratio, bis-(2,3-epoxypropanol)-esters obtained by esterification of dicarboxylic acids, preferably having up to 15 carbon atoms, such as terephthalic acid, phthalic acid, 2,6-napthalendicarboxylic acid, adipic acid, succinic acid and dodecane dicarboxylic acid with 2,3-epoxypropanol, and cycloaliphatic diepoxides, preferably having 5–15 carbon atoms, such as cyclooctadiene-(1,5)-diepoxide, 1,2,5,6-diepoxy cyclododecane-9, bicyclohepadiene diepoxide, dicyclopentadiene diepoxide. A suitable diepoxy compound for use in the invention is for instance, a bisphenol A diglycidyl ether of formula IV where n is normally zero:

Multiphase composite polymer is also preferably used in compositions of the invention in amounts between about 5 and about 40 wt% based on poly ($C_2$–$C_4$ alkylene terephthalate) and comprises from about 25 to about 95 weight percent of a first elastomeric phase and about 75 to 5 weight percent of a final rigid thermoplastic phase. One or more intermediate phases are optional, for example a middle stage polymerized from about 75 to 100 percent by weight styrene. The first stage is polymerized from about 75 to 99.8 weight percent $C_1$ to $C_6$ acrylate resulting in an acrylic rubber core having a glass transition temperature below about 10° C. and crosslinked with 0.1 to 5 weight percent crosslinking monomer and further containing 0.1 to 5 percent by weight graftlinking monomer.

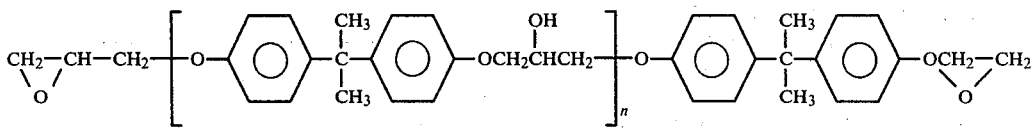

Formula IV

The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizes at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized 35 from about 60 to 100 percent by weight methyl methacrylate.

The final stage monomer system can be comprised of $C_1$ to $C_{16}$ methacrylate, styrene, acrylonitrile, alkyl acrylates, allyl methacrylate, diallyl methacrylate, and the like, as long as the overall glass transition temperature is at least about 20° C. Preferably the final stage monomer system is at least about 50 weight percent $C_1$ to $C_4$ alkyl methacrylate. It is further preferred that the final stage polymer be free of units which tend to degrade poly(alkylene terephthalates), for example acid, hydroxyl, amino, and amide groups.

For further descriptions and examples of various multiphase polymers and diepoxy compounds suitable for use in the present invention, reference may be had to the aforementioned U.S. Pat. Nos. 4,010,219 and 4,096,202 the disclosures of which are incorporated herein by reference. Additional examples of multiphase polymers suitable for use in the invention may be found in U.S. Pat. No. 4,034,013 the disclosure of which is also incorporated herein by reference.

Between about 5 and about 40 wt% based on total molding composition of Poly ($C_2$–$C_4$ alkylene terephthalate-co-alkylene-oxide) is also preferably used in compositions of the invention. Preferred Poly ($C_2$–$C_4$ alkylene terephthalate-co-alkylene-oxide) for use in the invention is poly (butylene terephthalate-co-tetramethylene oxide). Suitable Poly ($C_2$–$C_4$ alkylene terephthalate-co-alkylene-oxide) elastomers and their preparation are well known as described for instance in U.S. Pat. No. 3,766,146. In an equally preferred embodiment, between about 5 and about 40 wt% based on total molding composition of poly ($C_2$–$C_4$ alkylene terephthalate-co-alkylene oxide) having a Shore D hardness between about 50 and about 60 and a melt index between about 7 and about 9 is used.

Compositions and products of the invention may also contain up to about 25 weight percent based on polyalkylene terephthalate of suitable flame retardant additives and may contain relatively minor amounts of other materials which do not unduly effect the desired characteristics of finished products. Such additional materials may, depending upon the particular compositions employed and products desired include for instance, colorants or lubricants. Where present such additional materials other than flame retardants or filler normally comprise not more than about 10 weight percent of the total molding composition or finished product.

Compositions and products of the invention may also include reinforcing fibers or inert filler of conventional types and amounts. In a preferred embodiment between about 5 and about 100 weight percent based on polyalkylene terephthalate of glass reinforcing fibers is present. Inert filler material where used is normally present in amounts between about 10 and about 100 weight percent based on polyalkylene terephthalate and may include such materials as glass spheres, clay, mica, talc, silica, silicates, oxides, etc.

In preparing compositions of the invention the various ingredients may be prepared by conventional methods and blended in any suitable manner such as by dry blending or melt blending, blending in extruders, heated rolls, or other types of mixers. Conventional master batching techniques may also be used. Suitable manufacture and blending techniques are well known in the art and need not be described in detail here.

The following examples are intended to illustrate the invention without limiting the scope thereof. In the examples all quantities are given in terms of weight percent based on total compositions unless otherwise stated.

In the examples the term "epoxy" designates an epoxy compound of Formula IV. The term "latex" designates a multiphase composite polymer containing about 71 weight percent butylacrylate, about 24 weight percent methyl methacrylate, about 3 weight percent glycidal methacrylate, and about 2 weight percent styrene. The term "Hytrel" designates poly (butylene terephthalate-co-tetramethylene oxide) having a Shore D hardness of 55 and a melt index of 7. Antioxidants referred to are identified as follows:

Antioxidant A=tetrakis (methylene 3-(3', 5'-ditert-butyl-4'-hydroxy phenyl propionate) methane
Antioxidant B=o,o-di-n-octadecyl-3,5-di-tertbutyl-4-hydroxybenzyl phosphonate
Antioxidant C=4,4'-bis(alpha dimethyl benzyl) diphenyl amine The lubricant used was ethylene bis-stearamide. Fiberglass used was OCF K419AA having diameters betwen about 5 and 15 microns and lengths of about 5 mm.

EXAMPLE 1

For this example a number of compositions were prepared utilizing PBT and additional components as indicated in Table I below.

The time in days for 50% loss of impact properties with the specimens stored at 170° C. was also measured.

Compositions tested as reported herein were prepared from several different PBT compositions as indicated in the examples. The compositions were compounded on a Midland Ross 1.5 inch extruder using the following conditions: temperature 240°–270° C., pressure 0–2000 psi, amperage 10–30 and screw RPM 75–150. In each case the pelletized extrudate was then molded on a reciprocating screw injection molding machine to provide test specimens. Compositions tested and impact strengths of resulting test specimens are shown in Table I.

EXAMPLE 2

For this example a number of additional compositions were prepared and extruded as described in Example 1.

Compositions tested and impact strengths of the test specimens are shown in Table II.

TABLE I

| Composition No. | 1 | 2 | 3 | 4 | 5 | 6 | 7 | 8 | 9 | 10 | 11 |
|---|---|---|---|---|---|---|---|---|---|---|---|
| Ingredients and Impact Properties | | | | | | | | | | | |
| 0.8 I.V. PBT | 100 | — | — | 71.6 | — | — | 70 | — | — | — | 5.25 |
| 1.2 I.V. PBT | — | 100 | 71.6 | — | 71.6 | 57.5 | — | 70 | 50.12 | 50.7 | 35 |
| Latex | | | 20 | 20 | 20 | 20 | | | 14 | 14 | 14 |
| Hytrel | | | 7.5 | 7.5 | 7.5 | 7.5 | | | 5.25 | 5.25 | 5.25 |
| Epoxy | | | 0.5 | 0.5 | 0.5 | 0.5 | | | 0.35 | 0.35 | 0.35 |
| Antioxidant A | | | 0.3 | 0.3 | — | — | | | 0.2 | — | — |
| Antioxidant B | | | 0.3 | — | — | — | | | 0.2 | — | — |
| Antioxidant C | | | 0.3 | 0.3 | — | — | | | 0.2 | — | — |
| Lubricant | | | 0.4 | 0.4 | 0.4 | 0.4 | 0.4 | 0.4 | 0.4 | 0.4 | 0.4 |
| Fiberglass | | | — | — | — | — | 30 | 30 | 30 | 30 | 30 |
| Polycarbonate | | | — | — | — | 7.5 | — | — | — | — | 5.25 |
| Impact, notched | 0.7 | 1.0 | 17.2 | 2.3 | 16.2 | 18.4 | 1.7 | 2.3 | 4.3 | 3.7 | 4.1 |
| unnotched | 40 | 42 | 39.8 | 36.4 | 40.1 | 40.4 | 12 | 16.0 | 17.2 | 15.6 | 16.2 |
| Time to 50% loss of impact properties, days at 170° C. | — | — | 32 | 10 | 9 | 15 | 25 | — | 95 | 54 | 53 |

TABLE II

| Composition No. | 1 | 2 | 3 | 4 | 5 | 6 | 7 | 8 |
|---|---|---|---|---|---|---|---|---|
| Ingredients | | | | | | | | |
| 1.2 I.V. PBt | 71.6 | 71.9 | 71.9 | 71.9 | 72.2 | 72.2 | 72.2 | — |
| Epoxy | 0.5 | 0.5 | 0.5 | 0.5 | 0.5 | 0.5 | 0.5 | 0.5 |
| Latex | 20 | 20 | 20 | 29 | 20 | 20 | 20 | 20 |
| Hytrel | 7.5 | 7.5 | 7.5 | 7.5 | 7.5 | 7.5 | 7.5 | 7.5 |
| Antioxidant A | 0.3 | 0.3 | — | 0.3 | — | 0.3 | — | 0.3 |
| Antioxidant B | 0.3 | — | 0.3 | 0.3 | 0.3 | — | — | 0.3 |
| Antioxidant C | 0.3 | 0.3 | 0.3 | — | — | — | 0.3 | 0.3 |
| 0.8 I.V. PBT | | | | | | | | 71.6 |
| Impact Properties | | | | | | | | |
| Notched Izod 0 days | 20.0 | 19.6 | 20.0 | 19.0 | 19.3 | 19.6 | 18.9 | 2.3 |
| Notched Izod 14 days | 2.8 | 2.4 | 2.7 | 2.1 | 2.1 | 1.7 | 2.3 | 1.1 |
| Unnotched Izod 0 days | 42 | 40 | 42 | 40 | 45 | 42 | 40 | 36 |
| Unnotched Izod 14 days | 36.3 | 36 | 39.3 | 39.3 | 27.2 | 23.9 | 40.5 | 11.9 |
| time to 50% loss of impact properties (days at 170° C.) | 36 | 19 | 30 | 24 | 15 | 14 | 18 | 10 |

While the invention has been described above with respect to certain embodiments thereof, it will be understood by those skilled in the art that various changes and modifications may be made without departing from the spirit and scope of the invention.

What is claimed is:

1. Polyester molding composition comprising:
   (a) at least about 40 wt% poly ($C_2$-$C_4$ alkylene terephthalate) based on total composition;
   (b) between about 0.1 and about 5 wt% based on poly ($C_2$-$C_4$ alkylene terephthalate) of phosphonate of the formula:

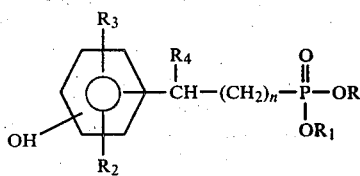

wherein n is 0 or 1 and:
   (i) when n is 1, each of R and $R_1$ is alkyl, having from 12 to 24 carbon atoms and $R_2$ and $R_3$ each independently represents alkyl having from 1 to 18 carbon atoms; and
   (ii) when n is 0, $R_2$, OH and $R_3$ are fixed, respectively, in the 3, 4 and 5 positions of the benzene ring portion of the benzyl phosphonate, each of R and $R_1$ is higher alkyl of from 14 to 30 carbon atoms, $R_2$ is alkyl of 1 to 6 carbon atoms, $R_3$ is tertiary butyl and $R_4$ is hydrogen or methyl;

(c) between about 0.1 and about 5 wt% based on poly ($C_2$–$C_4$ alkylene terephthalate) of compound of the formula:

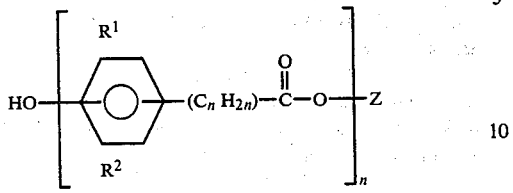

wherein:
$R^1$ is methyl, ethyl or an α-branched alkyl group of from 3 to 10 carbon atoms;
$R^2$ is hydrogen, methyl, ethyl or an α-branched alkyl group of from 3 to 10 carbon atoms;
x has a value of from 1 to 6;
n has a value of from 2 to 6; and
Z is an aliphatic hydrocarbon of the formula:

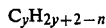

in which y has a value of from 2 to 18 when n is 2 and a value of from 3 to 6 when n is greater than 2, the value of y in all cases being equal to or greater than that of n; an d
(d) between about 0.1 and about 5 wt% based on poly ($C_2$–$C_4$ alkylene terepthalate) of diphenylamine derivative of the general formula:

Formula III

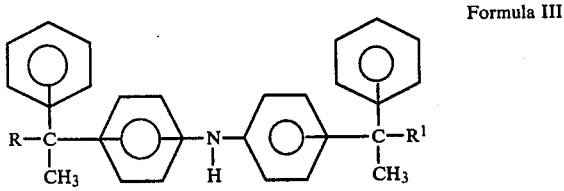

where R and $R^1$ are methyl or phenyl.

2. Composition according to claim 1 wherein the poly ($C_2$–$C_4$ alkylene terepthalate) comprises at least about 50 weight percent poly (butylene terephthalate).

3. Composition according to claim 2 wherein the poly butylene terephthalate has an intrinsic viscosity between about 1.0 and about 1.5 deciliters per gram.

4. Composition according to claim 3 which also contains:
(a) between about 0.1 and about 15 wt % based on poly ($C_2$–$C_4$ alkylene terephthalate) of a diepoxy compound represented by the general formula:

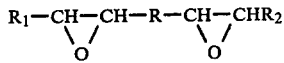

wherein $R_1$ and $R_2$ represent hydrogen, alkyl, cycloalkyl, aryl, or aralkyl, and $R_1$ and $R_2$ may be bonded to each other, and R represents alkylene, cycloalkylene, arylene, alkarylene or aralkylene, each of which may optionally have an ether group and/or an ester group, and R may be optionally bonded to $R_1$ and/or $R_2$; and
(b) between about 5 and about 40 weight % based on poly ($C_2$–$C_4$ alkylene terephthalate) of a multiphase composite polymer comprising:
(i) about 25 to about 95 wt % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethyleneically unsaturated monomer having a plurality of addition polymerizable reactive groups, at least one of which polymerizes at a substantially different rate of polymerization from at least one other of said reactive groups; and
(ii) about 75 to 5 wt % of a final, rigid thermoplastic phase polymerized in the presence of said elastomeriac phase; and
(c) between about 5 and about 40 weight % based on total composition of Poly ($C_2$–$C_4$ alkylene terephthalate-co-alkylene-oxide).

5. Composition according to claim 3 which also contains between about 5 and about 100 weight percent based on poly ($C_2$–$C_4$ alkylene terephthalate) of glass reinforcing fibers.

6. Composition according to claim 4 wherein the diepoxy compound is selected from the group consisting of polycondensates of epihalohydrin with diol, bis-(2,3-epoxy propanol)-esters which are the product of esterification of dicarboxylic acid with 2,3-epoxy-propanol, and cycloaliphatic diepoxides.

7. Composition according to claim 4 wherein said first phase of the multiphase polymer comprises between about 60 and about 95 weight percent of said multiphase polymer, said first phase is polymerized from a monomer system comprising between 95 and about 99.8 percent by weight butyl acrylate, between about 0.1 and about 2.5 weight percent butylene diacrylate as a crosslinking agent, and between about 0.1 and about 2.5 weight percent allyl methacrylate or diallyl maleate as a graftlinking agent and said final phase of said multiphase polymer is polymerized from about 60 to 100 weight percent methyl methacrylate.

8. Composition according to claim 4 wherein between about 5 and about 40 weight % based on total molding composition of poly (butylene terephthalate-co-tetramethylene oxide) having a Shore D hardness between about 50 and about 60 and a melt index between about 7 and about 9 is used.

9. Composition according to claim 4 wherein:
(a) the ingredient specified in claim 1 (b) is o,o-di-n-octadecyl-3,5-di-tert-butyl-4-hydroxy benzyl phosphonate;
(b) the ingredient specified in claim 1 (c) is tetrakis [methylene 3-(3',5'-ditert-butyl-4'-hydroxy phenyl) propionate] methane; and
(c) the ingredient specified in claim 1 (d) is 4,4¹-bis (alpha dimethyl benzyl) diphenyl amine.

10. Composition according to claim 9 wherein:
(a) the composition also contains between about 5 and about 100 wt % based on poly ($C_2$–$C_4$ alkylene terephthalate of glass reinforcing fibers;
(b) the diepoxy compound is selected from the group consisting of polycondensates of ephialohydrin with diol, bis-(2,3-epoxy propanol)-esters which are the product of esterification of dicarboxylic acids and cycloaliphatic diepoxides;

(c) the first phase of the multiphase polymer comprises between about 60 and about 95 wt % of said multiphase polymer, said first phase is polymerized from a monomer system comprising between 95 and 99.8% by weight butyl acrylate, between about 0.1 and about 2.5 wt% butylene diacrylate as a crosslinking agent; and (d) said final phase of said multiphase polymer is polymerized from about 60 to 100 weight percent methyl methacrylate and fibers;

11. An injection molded article molded from molding composition of claim 1.

12. An injection molded article molded from the molding composition of claim 3.

13. An injection molded article molded from the molding composition of claim 9.

14. An injection molded article molded from the molding composition of claim 10.

UNITED STATES PATENT AND TRADEMARK OFFICE
CERTIFICATE OF CORRECTION

PATENT NO. : 4,277,391
DATED : July 7, 1981
INVENTOR(S) : John J. Charles

It is certified that error appears in the above—identified patent and that said Letters Patent is hereby corrected as shown below:

The formula appearing in column 2 at lines 1-9 and in column 9 at lines 5-12 should appear as follows:

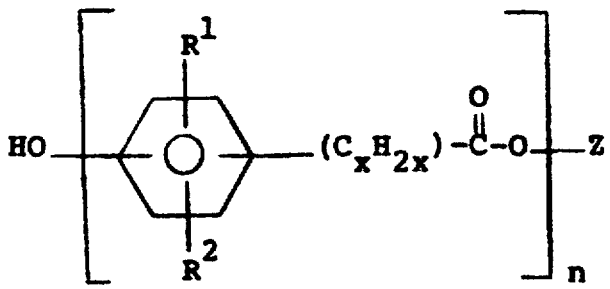

Signed and Sealed this

Twentieth Day of July 1982

[SEAL]

Attest:

Attesting Officer

GERALD J. MOSSINGHOFF

Commissioner of Patents and Trademarks